United States Patent [19]
Alexander

[11] Patent Number: 4,930,431
[45] Date of Patent: Jun. 5, 1990

[54] NO-TILL FIELD IMPLEMENT

[76] Inventor: Malcolm H. Alexander, Illinois Veterans Home, Quincy, Ill. 62301

[21] Appl. No.: 377,043

[22] Filed: Jul. 10, 1989

[51] Int. Cl.⁵ .................. A01L 5/06; A01B 5/06; A01B 61/04; B67D 3/00
[52] U.S. Cl. .................. 111/164; 111/170; 111/197; 111/925; 172/572; 172/265; 172/575; 222/486
[58] Field of Search ............... 172/573, 574, 575, 572, 172/265, 264; 111/139, 140, 144, 164-170, 121, 124, 126, 122, 120, 34, 52, 63, 66, 73, 74, 75, 79, 80, 81, 141, 143, 157, 163, 197, 198; 222/485, 486, 482, 608, 609

[56] References Cited

U.S. PATENT DOCUMENTS

| | | | |
|---|---|---|---|
| 19,871 | 4/1858 | Risher | 222/485 |
| 526,436 | 9/1894 | Campbell | 111/165 |
| 736,963 | 8/1903 | Ham | 111/165 |
| 790,410 | 5/1905 | Warne | 172/265 |
| T862,011 | 5/1969 | Koronka | 111/140 |
| 1,029,679 | 6/1912 | Grieves | 111/190 |
| 1,233,010 | 7/1917 | Altgelt | 111/190 |
| 1,840,602 | 1/1932 | Pender | 222/486 |
| 2,155,783 | 4/1939 | Butcher | 222/486 |
| 2,211,675 | 8/1940 | Rushbrook | 172/572 |
| 2,296,175 | 9/1942 | Morkoski | 172/265 |
| 2,410,937 | 11/1946 | Harder | 222/485 |
| 2,722,902 | 11/1955 | Hyatt | 111/140 |
| 2,768,773 | 10/1956 | Bjerre | 222/485 |
| 3,701,327 | 10/1972 | Krumholz | 111/140 |
| 4,550,122 | 10/1985 | David | 111/140 |
| 4,574,715 | 3/1986 | Dietrich | 111/140 |

FOREIGN PATENT DOCUMENTS 82338  11/1956  Denmark ............... 172/575

Primary Examiner—Danton D. DeMille
Attorney, Agent, or Firm—Joseph W. Holloway

[57] ABSTRACT

An implement for agricultural field work is primarily useful for preparing a field for no-till planting and comprises a wheel carried frame for carrying a massive fertilizer hopper which has apertures in its bottom portion through which fertilizer flows at a metered rate into feed tubes which carry the fertilizer to furrows formed by double-disc ground openers mounted on the frame. The openers aerate the soil and chop crop residues remaining on the ground surface from the previous crop. Hoes attached to the openers draw a portion of the soil displaced from the furrows back into the furrows after the fertilizer is deposited therein.

2 Claims, 3 Drawing Sheets

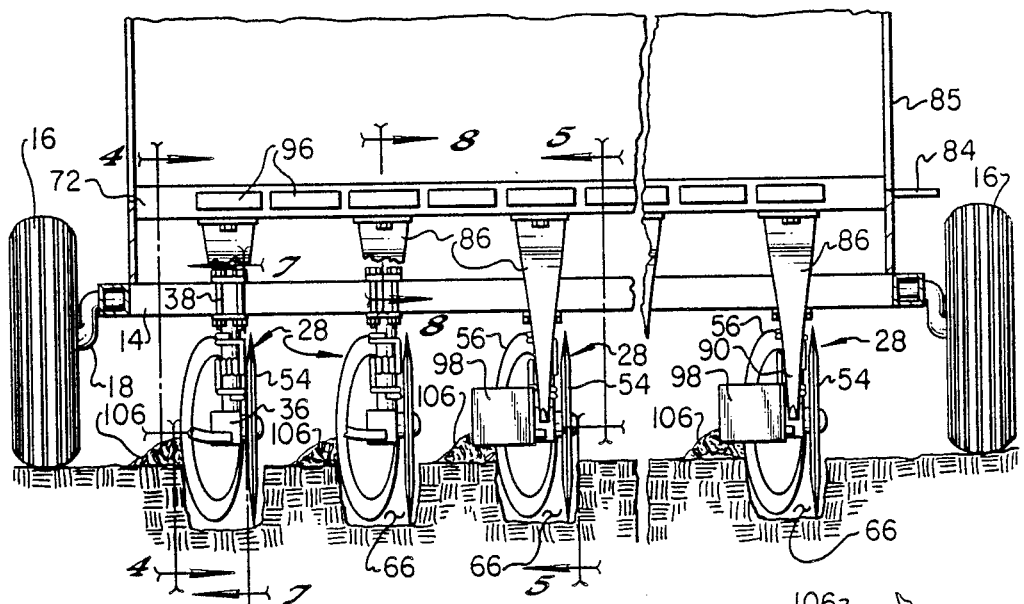
Fig. 3
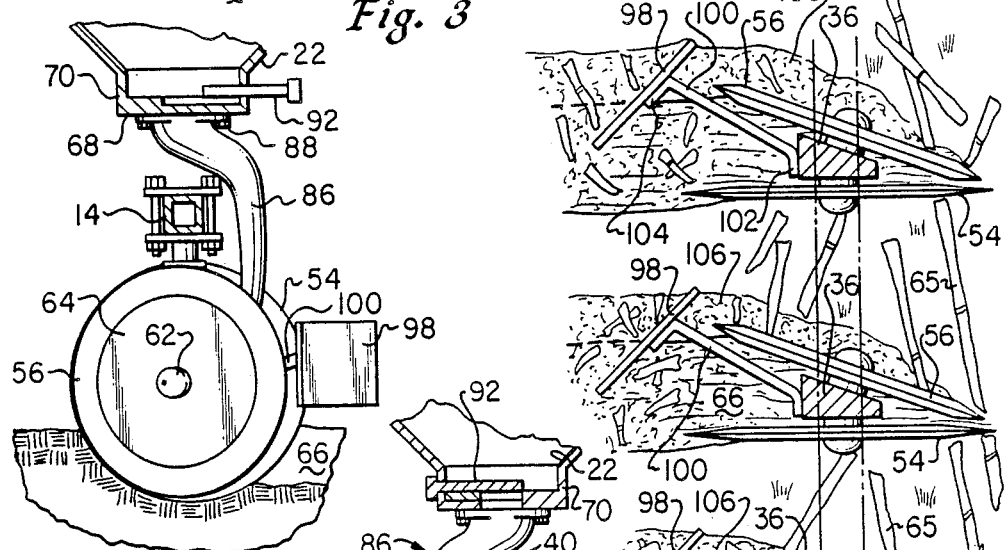
Fig. 4
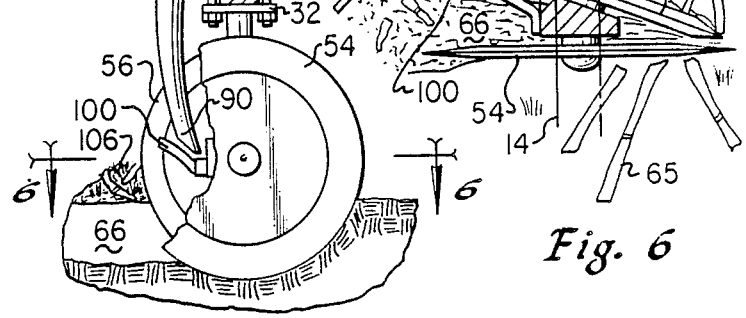
Fig. 5
Fig. 6

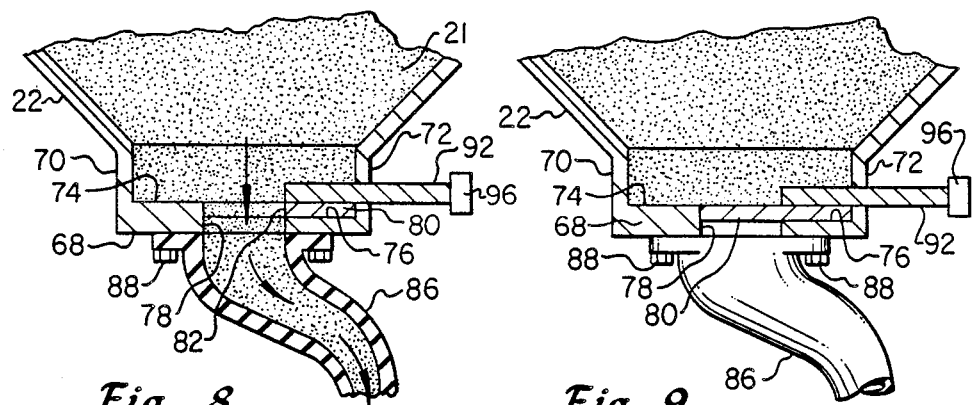
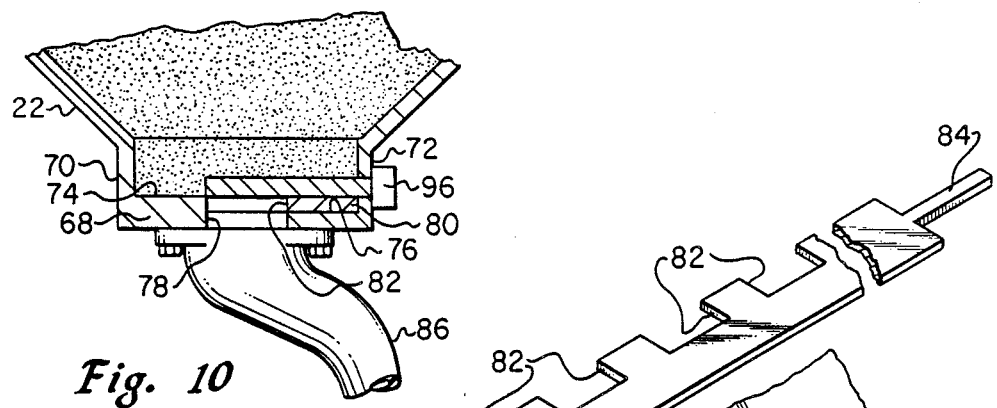
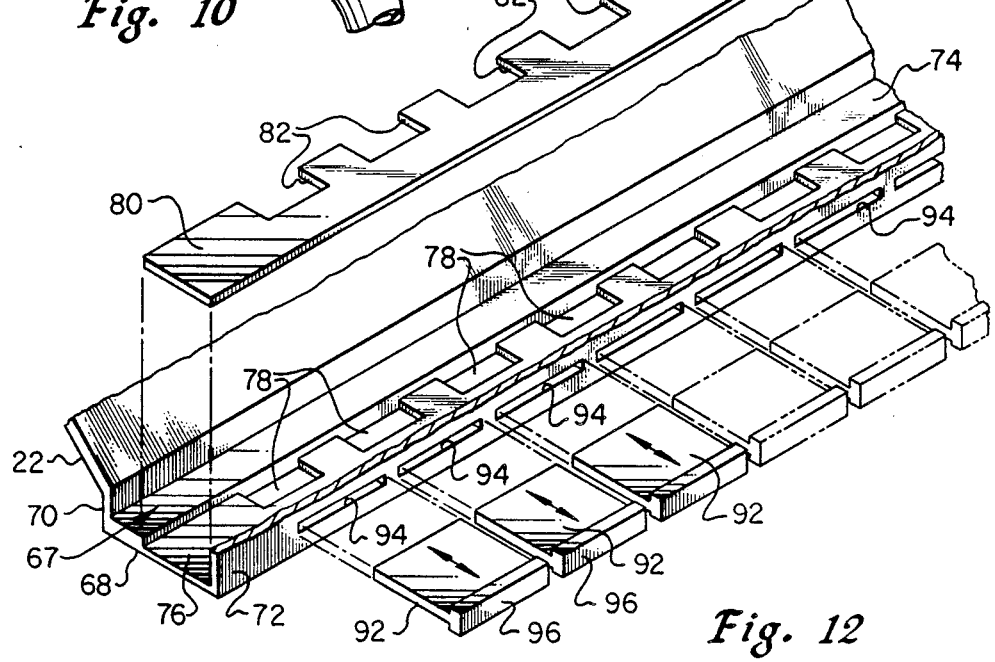

NO-TILL FIELD IMPLEMENT

BACKGROUND OF THE INVENTION

This invention generally pertains to a multifunctional field implement useful in the practice of conservation tillage of the type which reduces soil disturbance and leaves a protective mulch of crop residue on the soil surface.

It is well established that bare, smooth soil left by clean moldboard plowing and intensive secondary tillage is extremely susceptible to water and wind erosion. Such erosion permanently removes that layer of soil and accompanying nutrients which are most favorable for crop growth. Thereafter, these natural nutrients must be replaced with costly added fertilizer in order to maintain yields and land values. Runoff from eroding fields may carry a variety of chemical pollutants and substantial quantities of sedimentary materials into streams, rivers and ponds thereby biologically degrading the quality of our fresh water supply and reducing the storage capacity of lakes and reservoirs. This threat to the nation posed by soil erosion and water pollution resulting from long standing farming method has resulted in the U.S. Department of Agriculture formulating practices which future recipients of certain farm subsidies and payments must adopt in connection with controlling erosion and pollution levels resulting from the recipient's farming operations.

The potential for irreversible loss of agricultural land base, unacceptable levels of water and air pollution and the prospect of governmental sanctions are causing increased numbers of farmers to adopt a conservation tillage practice whereby a new crop is planted directly in the stalks and stubble remaining from the previous harvested crop. Seed is planted in undisturbed ground by a special seed drill equipped to plant through residue lying upon firm soil. This conservation tillage system which greatly reduces soil disturbance and leaves the crop residue on the soil surface is commonly referred to as the "no-till" system of farming.

Generally, the no-till system entails applying plant nutrients on the soil surface prior to planting and pre-emergence herbicides are applied after planting to control weeds and grasses.

Some of the general advantages of no-till farming are as follows:

Crop residues serve to reduce runoff of excess rainwater even on substantial slopes;

Because crop residues reduce water runoff, they tend to hold plant nutrients and applied fertilizers in place with a concomitant reduction in pollution of downstream water sources;

Crop residues slow and break up wind currents at the soil surface thereby reducing soil partical erosion;

Crop residues contacting the soil reduce evaporation thereby conserving soil moisture for use by the crop; and, Power and labor costs are considerably lower than those required by conventional tillage systems which loosen top soil and turn under some or all of the crop residue.

In conjunction with no-till farming, it is desirable to knock down and chop up the stalks and stems left standing in a field in order to facilitate the application of fertilizer and to place more of the crop residue in direct contact with the ground. Thus broadcasting of fertilizer over a no-till field is easier and more even if the large stalks of crops, such as corn, are flattened first. By chopping the stalks and stems into smaller segments, direct contact with the soil is more likely and more rapid decomposition of such organic residue, hence their conversion to plant nutrients, is facilitated.

Many farmers who have adopted the no-till system find that applying dry, granular commercial fertilizer compounds in the Fall of the year is best suited to their schedule for field work and reduces the risk that a rainy Spring season will interfer with fertilizer application at that time. Advantages have been found in placing dry fertilizer in bands at shallow depths and covering the same rather than broadcasting the fertilizer granuals on top of the crop residue. It is also believed that some degree of Fall soil aeration beyond that contemplated by conventional no-till practice permits moisture penetration, reduces water runoff and promotes the growth of organisms which produce rapid decomposition of crop residues.

While residue choppers, subsoil fertilizer banders and soil aerators are to be found as separate implements and could be used in successive operations, it is believed that no composite implement has heretofore been designed to provide all of these functions in a single trip over a no-till field. Therefore, a more universal adoption of no-till practices may yet today be impeded by the unattractive prospects of investing substantial capital in a plurality of costly implements and of incurring repetitious operating expenses in the Fall season preparation of a field for no-till Spring season planting.

SUMMARY OF THE INVENTION

The principal object of this invention is to obviate the shortcomings of prior art implements used in conjunction with a method of preparing a field for no-till planting.

The general object of this invention is to provide a multipurpose implement which is well adapted to perform the following functions or steps:

Flatten and chop crop stalks and stems in segments of selectively variable size.

Aerate the soil by means of ground opening discs.

Place a metered quantity of fertilizer in a plurality of furrows formed by the action of the ground-opening discs.

Hoe a portion of the soil displaced from the furrow together with surface residues back into the furrow into close contact with the fertilizer previously placed therein.

The present invention contemplates a novel implement which is capable of performing all of the above functions or steps in a single trip over a stubble field in the Fall of the year whereby certain additional advantages are available beyond those general advantages of no-till farming set forth above, namely:

Stalks and stems are flattened and chopped into short segments so that they either lie closely upon the soil surface as a mulch or are hoed into the furrow and intermixed with soil. Such chopping and intermixture of the crop residues enhances their decomposition and the mineralization of nutrients contained therein. The soil is aerated by the furrow-opening action of the discs whereby the growth and population of organisms which decompose the residue is enhanced. The furrows receive a fertilizer mixture which is held in place by overlying soil and residues and by the tendency of the chopped stalks and stems lying in the furrows to form a nearly infinite number of barriers or dams to impede any flow of excess rain water through the furrows.

Fall season application of fertilizer to no-till fields frees time and equipment for planting and applying herbicide at a highly critical time in the Spring season.

The spacing of bands of applied fertilizer can be varied from nearly full coverage for small grains and grasses to very wide spacing for corn and other row crops.

By bringing together the functions of separate implements for chopping residues, soil aeration, and subsoil fertilizer banding into one implement, the initial equipment cost is substantially reduced and multiple field trips are eliminated whereby fuel and labor costs are also significantly reduced.

Another object of the invention is to provide a multipurpose implement of the aforedescribed character having a rank of double disc ground openers mounted on a heavy beam extending transversely to the direction of implement travel whereby the number of openers and their lateral spacing along the beam is variable with the minimum opener-to-opener spacing being about six inches in order to chop stalks and stems overrun by the openers into short segments no longer than about six inches.

Another object is to provide an implement of the aforedescribed character having a massive hopper from which fertilizer flows by gravity or otherwise into plural feed tubes which depend between the circular blades of the openers for dropping fertilizer into the furrows formed by the ground openers. The rate of fertilizer flow to the feed tubes is variable and is controlled by a single elongated gate which extends the width of said hopper and regulates the area of the openings from the hopper bottom to the top of each feed tube. A related object is to provide a mechanical linkage between the gate and the ground support wheels for the hopper which will activate the gate to the closed condition when the wheels are lowered to raise the disc openers out of engagement with the soil surface.

Yet another object is to provide an implement of the aforedescribed character having means for closing only selected openings from the hopper so that certain feed tubes will not be supplied with fertilizer for delivery to the furrows formed by their associated ground openers. Thus the chopping and aerating functions of all openers can be constantly maintained while the spacing between the bands of fertilizer dropped into individual furrows can be selectively adjusted. The proximity of bands to one another can be adjusted to meet such variables as crop selection, soil type, fertilizer components and analysis, soil moisture and anticipated rain fall amounts.

A more detailed object of this invention is the provision of a multifunctional implement which employs a rugged double-disc type of ground opener to chop residue in its path and thereafter to open a furrow in dense, unworked soil. Each pair of discs comprises a forward coulter blade and a trailing furrow opening disc canted at an angle to the coulter blade. The coulter blade rolls in a plane parallel to the travel of the implement and, therefore, is not highly stressed as its leading edge slices through soil and severs crop residues. On the other hand, the furrow opening disc is highly stressed and is subject to rapid wear since it is mounted at an angle of about 20 degrees to the coulter blade and wedges unworked soil outwardly to form a furrow which is typically about four inches wide and varies in depth up to about six inches. In accordance with this invention, the furrow opening blade is of more rugged construction than conventional disc or opener blades in two important respects, namely:

The mounting shank for each pair of ground opening discs terminates at its lower end in an enlarged, wedge shaped trunnion having projecting bosses for mounting heavy duty bearings which carry the discs at a selected angle to one another.

The furrow opening disc is constructed to resist lateral flexing and bending due to extremely high reactive forces imparted to its soil engaging surface as the disc displaces soil from the furrow by a continuous wedging action. To this end a major hub portion of this disc is thickened more than is a conventional disc blade and the sides of the hub portion are straight and parallel. The tapered edge portion of the disc comprises only a small segment of the disc diameter.

A still further object is to provide a simple hoeing device for drawing soil and crop residue into the furrows after fertilizer has been dropped thereinto. Such a hoe may be advantageously attached to the trunnion block for each double-disc ground opener thereby eliminating the need for a separate transverse mounting beam similar to the beam which mounts the gang of openers.

These and other advantageous features of this invention will become apparent and the invention will be best understood and fully appreciated by having reference to the following detailed description of an embodiment of the invention taken in conjunction with the accompanying drawings.

DESCRIPTION OF THE DRAWINGS

FIG. 3 is a fragmentary sectional view taken generally along lines 3—3 of FIG. 2. Certain components have been broken away and some of the feed tubes have been removed for clarity;

FIG. 4 is a view taken along lines 4—4 of FIG. 3;

FIG. 5 is a view taken along lines 5—5 of FIG. 3;

FIG. 6 is a fragmentary view taken through the disc mounting trunnions and looking down on the ground surface;

FIG. 8 is fragmentary section taken along lines 8—8 of FIG. 3.

FIG. 9 is a view similar to FIG. 8 showing a gate component in a changed position;

FIG. 10 is a view similar to FIGS. 8 and 9 showing a closure plate in a changed position;

DETAILED DESCRIPTION OF THE INVENTION

Figure 1:
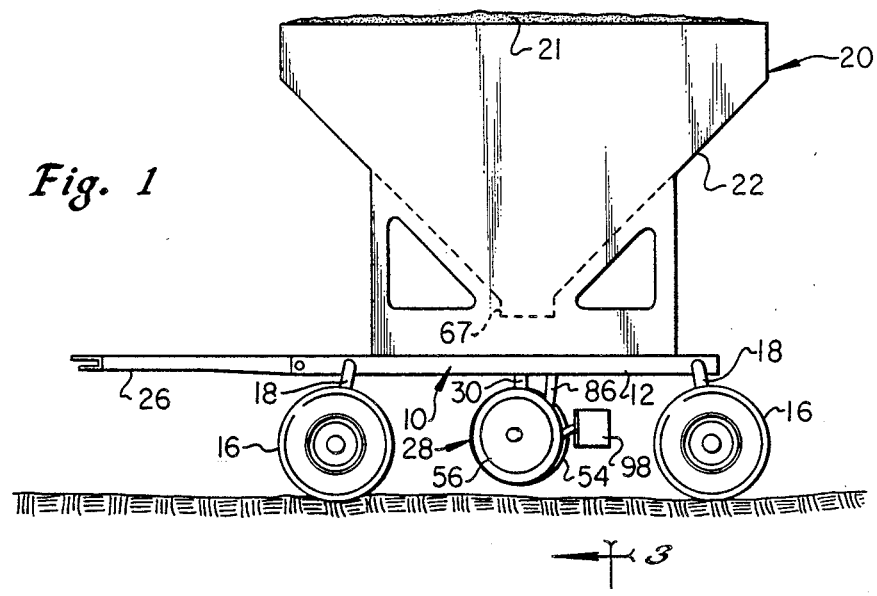
FIG. 1 is a side elevational view of a field implement according to this invention showing the ground wheels in their lowered position and the ground openers in their raised position.
Figure 2:
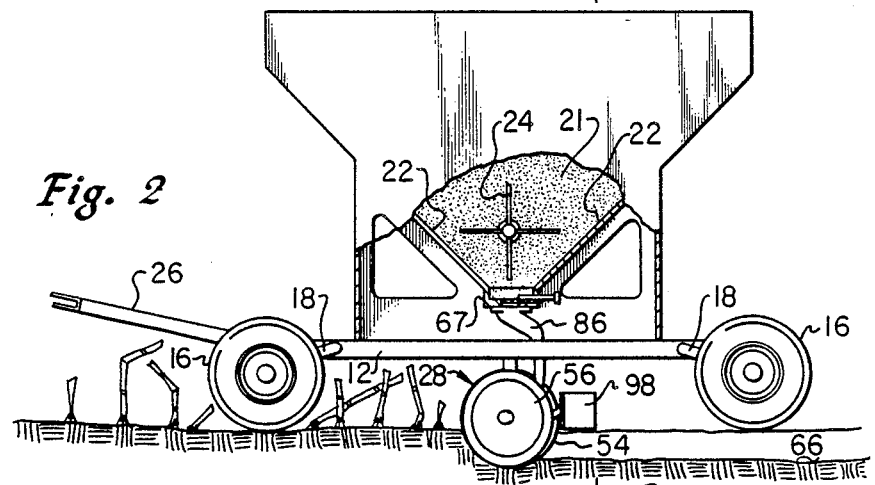
FIG. 2 is a view similar to FIG. 1 with a portion of the hopper broken away and showing the ground wheels in their raised condition and the ground openers in their lowered position whereby a furrow has been formed.

As best illustrated by FIGS. 2 and 3, the embodiment of the invention shown in the drawings has a chasis or frame 10 made of thick-walled tubular side members 12 connected at opposite ends by similar transverse members, not shown. For a purpose to be described, the frame also includes a transverse medial beam 14 connecting the midpoints of the side members 12. Proximate the opposite ends of the side members are ground engaging pneumatic wheels 16 carried on cranktype axles 18 journalled through the side members 12. The frame 10 is raised to its FIG. 1 position or lowered to its FIG. 2 position by rotating the axles 18 preferably by means of a single hydraulic actuator connecting both axles or, alternatively, by plural but commonly controlled actuators connected to each of the axles. Such hydraulic actuators and their controls and circuitry are commonly employed on farm implements and need not be shown or described in detail herein.

The hopper 20 is of conventional design, is carried above the frame 10 in generally vertical alignment with beam 14, and has a preferred capacity of about 10,000 pounds of dry fertilizer 21 having a angle of repose less than the slope of the side walls 22 of hopper 20. FIG. 2 shows a paddle type rotary agitator 24 journalled inside hopper 20 for breaking up any lumps and for minimizing the effects of fertilzer head changes as the hopper empties. The agitator 20 may be suitably connected to and driven by one of the ground wheels or a hydraulic motor, not shown, may be used for this purpose. Due to the great weight of fertilizer it can carry, the implement according to this invention is of the wheel mounted pull hitch type; therefore, a suitable draw bar 26 extends from the front end of the frame 10 for attachment to a tractor or like draft vehicle, not shown.

Figure 7:
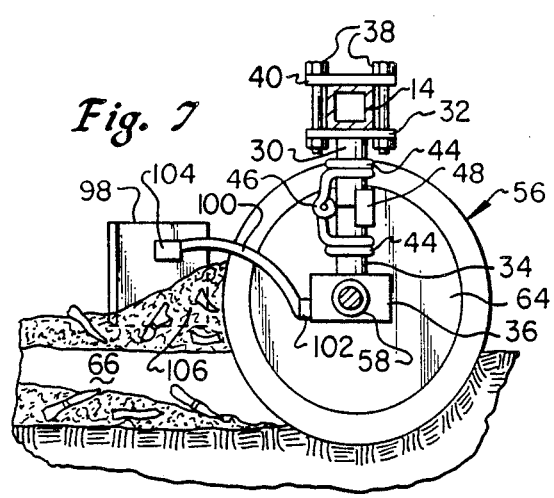
FIG. 7 is a fragmentary section taken along lines 7—7 of FIG. 3 showing details of a spring cushion arrangement for a shank and a hoe attached to the shank.

As best shown in FIG. 3, the aforementioned transverse beam 14 is employed for mounting a rank of double disc ground openers, each of which is indicated in its entirety by numeral 28, in general alignment with the bottom of hopper 20. All of the openers are identically constructed and interchangeable. Each includes a spring cushioned shank mount having an upper segment 30 exhibiting an enlarged, flat head 32 and a vertically aligned lower segment 34 which terminates in an enlarged, wedge-shaped trunnion block 36. The head 32 is clamped to the underside of the beam 14 by bolts 38 which penetrate a flat plate 40 overlying the beam. As best seen in FIG. 7, the upper and lower shank segments 30, 34 are elongated cylindrical members joined by a compound spring having opposed coaxial coils 44 which are in surrounding engagement with the segments and a transverse torsion spring 46 which biases the abutting end surfaces of the segments firmly together. A curved brace 48 attached to either one of the segments serves to maintain longitudinal alignment of the segments. Should a ground opener strike a rock, stump or other object as it is drawn from left to right as viewed in FIG. 7, the lower shank segment 34 will be resiliently displaced toward the left causing the transverse spring 46 to flex. The brace 48 assists this spring in maintaining the shank segments in substantial alignment during their separation and, after the object is overridden, torque supplied by spring 46 will forcibly restore the abuttment and vertical alignment of the shank portions 30 and 34.

Figure 11:
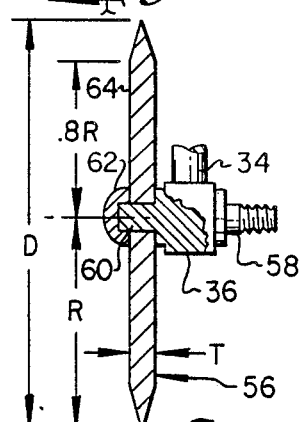
FIG. 11 is a fragmentary sectional view taken generally along a diameter of a furrow opening blade; and, FIG. 12 is an exploded isometric view showing a fragment of the hopper bottom and illustrating how the gate and the closure plates are movable with respect thereto.

The one-piece trunnion 36 is preferably integral with the lower shank segment 34 and comprises a block of high-strength steel. One side surface 50 of the trunnion extends parallel to the line of travel of the implement and the other side surface 52 slopes from front to back with respect to surface 50 at about a 20 degree angle. In this manner the diverging angle between the planes of rotation of a rolling coulter 54 and a furrow opening disc 56 is established since the coulter 54 is mounted on a stepped boss 58 extending normally from surface 50 and the disc 56 is mounted on a stepped boss 60 extending normally from surface 52. Any type of heavy duty anti-friction bearing, not shown, may be disposed between the bosses 58, 60 and the central openings in the coulter 54 and the disc 56. As shown in FIG. 11, the disc blade 56 is removably secured to the trunnion 36 by a cap 62 which threadably coacts with the distal end of the boss 60. A similar cap is employed with the coulter 54. The coulter blade 54 may be of any commercially available configuration and, preferably, has a diameter about one inch greater than the furrow opening disc 56 for a purpose to be described.

As best illustrated in FIG. 11, the disc 56 has flat, parallel side surfaces and is much thicker over a larger portion of its diameter than known blades intended for lighter duty in order that it can resist the high level of bending stress encountered as it wedges out a furrow in firm, unworked soil. I prefer that the ratio of blade diameter D to thickness T be no less than 16:1 and that the blade have a hub having thickness T and having a radius which is at least 80 per cent of the blade radius R. Thus, a furrow opening blade, according to this invention, having a diameter of 16 inches should have a thickness of at least one inch and its hub 64 of maximum thickness would extend to within 1.6 inches of the circumferential cutting edge. The principal advantages of this invention may be substantially achieved with a furrow opening disc having characteristics falling outside the abovedescribed parameters; however, in firm to hard soils commonly encountered in no-till operations, rapid blade wear and early blade failure are likely.

As the implement 10 traverses a field of stubble, the lowered doubled-disc openers 28 will chop stalks 65 and open furrows 66 in the manner shown best in FIG. 6. The furrow depth is established by rotating the axles 18 to raise or lower the frame 10, transverse member 14 and openers 28. The combined mass of the implement and the fertilizer in its hopper will at all times provide sufficient weight to force the openers into the soil to the desired depth. According to this invention, it is not desirable that the disc 56 invert a layer of soil to bury surface material.

Fertilizer is fed from the hopper interior to the furrows in a manner best understood from viewing FIGS. 8–10 and 12. The lower portion of the hopper comprises a transversely extending trough-like receptacle 67 having a stepped interior bottom wall 68 and spaced upright walls 70 and 72. The bottom wall 68 includes an upper step 74 and a lower step 76 the latter having a plurality of transversely spaced rectangular apertures 78 opening therethrough. A flat elongated gate member 80 extends transversely of the trough for overlying sliding engagement with the lower step 76. One side of the gate 80 has a plurality of rectangular notches 82 relieved therein which have the same shape, size and spacing as the apertures 78 in the lower step 76. The gate 80 may be freely reciprocated within the trough to establish a desired degree of alignment or misalignment between the apertures 78 and the notches 82. One means for reciprocating or shifting the gate 80 comprises the shank 84 which extends transversely from one end of the gate and, as shown in FIG. 3, the shank 84 projects through and beyond a side wall 85 of the hopper 20.

FIG. 8 illustrates a gate notch 82 in alignment with an aperture 78 whereby fertilizer granuals or particles from the hopper interior flow through that notch 82 and an underlying aperture 78 and thence into the upper enlarged head of a rearwardly curved feed tube 86 attached by fasteners 88 to the underside of the bottom wall 68. The tube 86 may be made of moldable, flexible plastic and depends downwardly and rearwardly so that its bottom or discharge end 90 terminates above the furrow 66 and intermediate the discs 54 and 56, as best seen in FIG. 5. The flow of fertilizer from the hopper is interrupted when the gate 80 completely overlies the aperture 78 as illustrated in FIG. 9. It will be understood that the rate of flow of fertilizer to the feed tubes 86 and to the furrows 66 can be metered between maximum flow and no flow conditions by moving the gate 80 with respect to the apertures 78. The projecting shank may be appropriately calibrated to relate the rate of fertilizer flow to the extent of shank projection beyond the hopper sidewall 85. It is also desirable to close completely the fertilizer flow path when the wheels 16 are completely lowered and also when the implement is stationary. Various well-known mechanical and hydraulic mechanisms may be brought into combination with the gate 80, the wheels 16 and the axle actuators for this purpose and need not be described herein in any detail.

In accordance with this invention, selected fertilizer feed tubes may be disabled by means of individually operable closure plates 92 juxtaposed proximate each of the apertures 78 in the bottom wall 68. The plates 92 closely fit into a like number of transversely spaced slots 94 opening through the upright side wall 72 of the trough 67 formed at the bottom of hopper 20. A slot is transversely aligned with each of the apertures 78. The individual plates may be manually grasped and shifted within the trough in the manner shown best by comparing FIG. 8 to FIG. 10. When a plate 92 is shifted to the FIG. 8 position, it is in its open condition, i.e. the end of the plate inside the hopper does not project into the trough sufficiently to block the underlying gate notch 82 and aperture 78. The closed condition of a plate 92 is shown in FIG. 10 where the plate is fully inserted through wall 72 and completely overlies a gate notch 82 and an associated aperture 78. The closure plates 92 are freely shiftable in the manner described regardless of the position of the gate 80 within the trough 67 since the plates freely override the upper surface of the gate 80. An enlarged head 96 formed on the exterior end of each plate 92 limits the travel of the plate inwardly into the trough and provides a handy manual grip. A suitable stop or detent, not shown, may be formed on the plates interiorly of the wall 72 to prevent the plates from completely separating rearwardly from the wall 72 and becoming lost. The desirability of disabling selected feed tubes 86 by means of the closure plates 92 will become apparent from a description of the operation of the invention which appears hereinafter.

A simple means for hoeing or scraping soil and residue back into a furrow 66 is provided by rectangular blades 98 which are conveniently attached to each of the trunnion blocks 36 by shanks 100. As best shown in FIGS. 6 and 7, the shank 100 has bent end portions 102 and 104. Bent end 102 is secured to the rearwardly facing surface of the trunnion block by welding or by suitable fasteners; and, bent end 104 is similarly secured to a blade 98. Preferably, the shank is somewhat flexible and is bent upwardly from its point of attachment to the trunnion block. The blade is positioned to the rear of the furrow opening disc 56 and follows this disc generally in line with the ridge of soil and residue 106 which is wedged outwardly from the furrow. The blade is vertically positioned and angled with respect to this soil ridge to scrape or hoe only a portion of the same back into the furrow on top of the fertilizer dropped into the furrow by the feed tubes 86. The shape of the blades 98 and the length and angularity of the shanks 100 may be changed as desired to vary the amount of soil redeposited into the furrows.

OPERATION OF THE INVENTION

Prior to commencing field work, the operator must assemble and adjust certain components of the implement to meet preselectable parameters, namely:
Spacing between furrows 66;
Depth of furrows and width of furrows 66;
Flow rate of fertilizer to furrows; and,
Spacing between bands of fertilizer.

The spacing between furrows 66 is determined by the number and spacing of double disc opener units 28 ganged to the transverse beam 14. In the configuration shown in FIGS. 3 and 6, every other one or only half the maximum number of openers 28 are secured in place on the beam by means of the clamping action of shank heads 32, plates 40 and bolts 38. Each opener 28 must be in underlying vertical alignment with one of the apertures 78 in the bottom wall 76 of hopper 20 so that the lower end of the feed tube can depend downwardly between the diverging rear portions of the coulter 54 and the furrow opening disc 56 for placement of a band of fertilizer in the furrow 66. The closest spacing of furrows is achieved by mounting an opener 28 under each of the hopper apertures 78. This minimum spacing of openers and furrows formed thereby is limited by practical considerations to about six inches between the centerlines of adjacent furrows. The selection of furrow spacing will, of course, determine the size of the pieces of stalks and stems created by the cutting action of the coulter blades 54. The principal function of the coulter blade is to roll into and to cleanly slice firm soil and overlying residue to a preselected depth. This vertical slicing action occurs proximate the leading edge of the coulter which, as indicated above and illustrated in FIG. 6, extends somewhat in advance of the leading edge of the canted furrow-opening disc 56. The leading edge of the disc 56 closely approaches that of the coulter. The angle of the disc 56 to the coulter 54 may be reduced if narrower furrows and finer residue chopping are desired.

In one embodiment of the invention having a hopper about 10 feet wide with fertilizer apertures 78 spaced about six inches apart center to center, a maximum of 20 furrow openers may be ganged on an appropriately sized beam 14. If an opener operates at its maximum practical depth of six inches, as shown in FIG. 3, the effective wedging divergence of disc 56 from the coulter 54 will be about four inches as will be the furrow formed thereby.

As earlier indicated, a transverse gang of ground openers 28 is raised and lowered by actuating the crank axles 18 for the wheels 16. Before going to the field, the operator should preselect a controllable depth for the furrows 66 which will also determine the width of the furrows. If the openers are set for a depth of soil penetration less than that shown in FIG. 3 for example, the width of the furrow wedged out by the heavy disc 56 will be somewhat narrower and the cross-sectional profile of the furrow will be somewhat different. The spacing between furrow centerlines will remain the same, however. The selected depth and width of the furrow 66 should be related to soil hardness, analysis and rate of application of the fertilizer and the weather conditions anticipated prior to planting. The desired depth of soil and residue to be replaced in the furrow by the hoe 98 may also affect the choice of furrow depth.

The fertilizer flow metering function, in accordance with this invention, is performed by the cooperation of the hopper bottom wall 76 having apertures 78 and the overlying, transversely shiftable gate plate 80 which has openings or notches 82 that can be fully or partially aligned with the apertures 78 to regulate the volume of fertilizer flowing from the hopper 20 to the feed tubes 86. The implement operator must select a position for the gate 80 that will meter the desired amount of fertilizer to the furrows as the implement is drawn over the field at a known speed. This decision will be based on many factors which need not be discussed here in order to obtain an appreciation of the features and benefits of this invention. As stated above, it is desirable that the position of the gate 80 be indicated on some scale or the like by the projecting shank 84 and that the gate be automatically operated to shut off the flow of fertilizer from the hopper 20 when the wheels are lowered to withdraw the openers from the soil. Such a no-flow condition is desirable when the implement is stopped for loading and the like and when the implement is turned at the end of rows or is being transported from field to field.

Finally, the operator must decide how much space is to be maintained between bands of fertilizer laid down by the feed tubes 86. One way to configure the implement for a selected band spacing would be to add or remove the required number of opener units 28 and to block fertilizer flow to any units so removed by means of the closure plates 92 described in detail above. However, a more effective way of carrying out the aims of this invention would be to provide initially a full rank of openers whereby each hopper aperture 78 is underlain by an opener unit 28 followed by insertion of selected plates 92 to achieve the desired band spacing. Assuming a six inch center-to-center distance between the hopper apertures 78, it is a simple matter of manually inserting closure plates 92 to obtain bands on centers spaced at intervals of 12, 24, 30 or 36 inches, for example. Even though certain furrows do not receive a band of fertilizer due to that furrow's feed tube being disable, the furrow will provide beneficial soil aeration and the coulter blade of every opener unit will be effective for cuttingstalks and stems into the shortest possible length.

Once in the field, the ground wheels 16 are raised; and, in response to such wheel movement, the gate 80 may be automatically shifted transversely to a preset stop position whereby fertilizer flows to the feed tubes 86 at a metered rate; however, a closure plate 92 may block the flow of fertilizer to certain feed tubes to establish a desired spacing between fertilizer bands. The depth of penetration of the opener units 28 into the dense, firm soil may be established by hydraulic actuators for the crank axles 18. All or some of the weight of the implement and the hopper contents will be borne by the openers 28 and the slicing and wedging action of the coulters 54 and the heavily constructed disc 56 will create spaced furrows as the implement traverses the field. Crop residue will be flattened and chopped into short lengths by the coulters 54. Fertilizer will be dropped behind the openers 28 into selected furrows and the hoes 98 will scrape soil and residue into the furrows. The cutting and wedging actions of the coulter 54 and the disc 56 in the unworked soil aerates and softens the same.

It will be apparent to those skilled in the art that modifications beyond those described may be made in this invention without departing from its scope and spirit. While the invention has been shown and described in terms of particular parts and arrangements, the invention is not limited thereto except as they are specifically set forth in the appended claims.

What I claim as my invention is:

1. A field implement primarily useful for Fall season preparation of agricultural land for no-till planting in the Spring season comprising:
    (a) ground wheel supported frame means;
    (b) hopper means mounted on top of said frame means for carrying a supply of dry, flowable fertilizer;
    (c) plural apertures opening from said hopper means through which fertilizer is flowable;
    (d) fertilizer flow regulating means in communication with said apertures;
    (e) a plurality of like furrow opening means mounted on said frame in substantially underlying vertical alignment with selected ones of said plural apertures;
    (f) each of said furrow opening means including a vertically depending shank having means for journaling a pair of rotary blades which coact for furrowing the soil as said implement traverses the ground;
    (g) said shank terminating in a trunnion block having one side surface generally parallel with the line of travel of said implement and having an opposed side surface inclined to said one side surface;
    (h) bosses integral with said block which respectively project normally from said one side surface and from said opposed side surface of said block and provide journaling means for said blades;
    (i) said shank comprising an elongated shaft including vertically aligned upper and lower portions;
    (j) said upper portion being removably secured to said frame and said lower portion having said block integrally formed therewith;
    (k) compound spring means attached to said portions for resiliently maintaining adjacent ends of said portions in abutting contact and said portions in vertical alignment; and,
    (l) fertilizer directing means communicating with said apertures and said flow regulating means for receiving a regulated flow of fertilizer from said hopper and for directing said regulated flow of fertilizer intermediate said blades and into furrows formed thereby.

2. A field implement primarily useful for Fall season preparation of agricultural land for no-till planting in the Spring season, comprising:
    (a) ground wheel supported frame means;
    (b) hopper means mounted on said frame means for carrying dry, flowable fertilizer;

(c) a bottom portion of said hopper means comprising a transverse trough having a bottom wall and side walls;
(d) plural apertures opening from said hopper means through which fertilizer is flowable;
(e) said apertures opening through said bottom wall at transversely spaced intervals;
(f) gate means shiftably mounted on said hopper means for fertilizer flow regulating movement relative to said apertures and comprising a unitary member which opens and closes all of said apertures simultaneously;
(g) said unitary member being elongated and having notches transversely spaced therealong for moving into and out of registration with said apertures in response to transverse shifting of said unitary member with respect to the underlying bottom wall of said trough;
(h) shut-off means shiftably mounted on said hopper means which prevent fertilizer from flowing through said apertures and comprising a plurality of discrete plates shiftably mounted relative to selected individual apertures for opening and closing the same;
(i) said plurality of discrete plates being slidably mounted in a like plurality of slots through a side wall of said trough;
(j) each of said plates overlying said unitary member and closing an underlying aperture when the same is fully inserted through a slot into said trough;
(k) a plurality of like furrow opening means mounted on said frame in substantially underlying vertical alignment with selected apertures opening from said hopper;
(l) each of said furrow opening means providing co-acting first and second rotary blades which engage the soil to form a furrow as said implement traverses the ground;
(m) fertilizer directing means communicating with said apertures for receiving a regulated flow of fertilizer from said hopper and for directing said fertilizer intermediate said blades and into said furrows; and,
(n) means attached to each of said furrow opening means for redepositing a portion of the soil removed by said furrow opening means back into said furrows.

* * * * *